Figure 1:
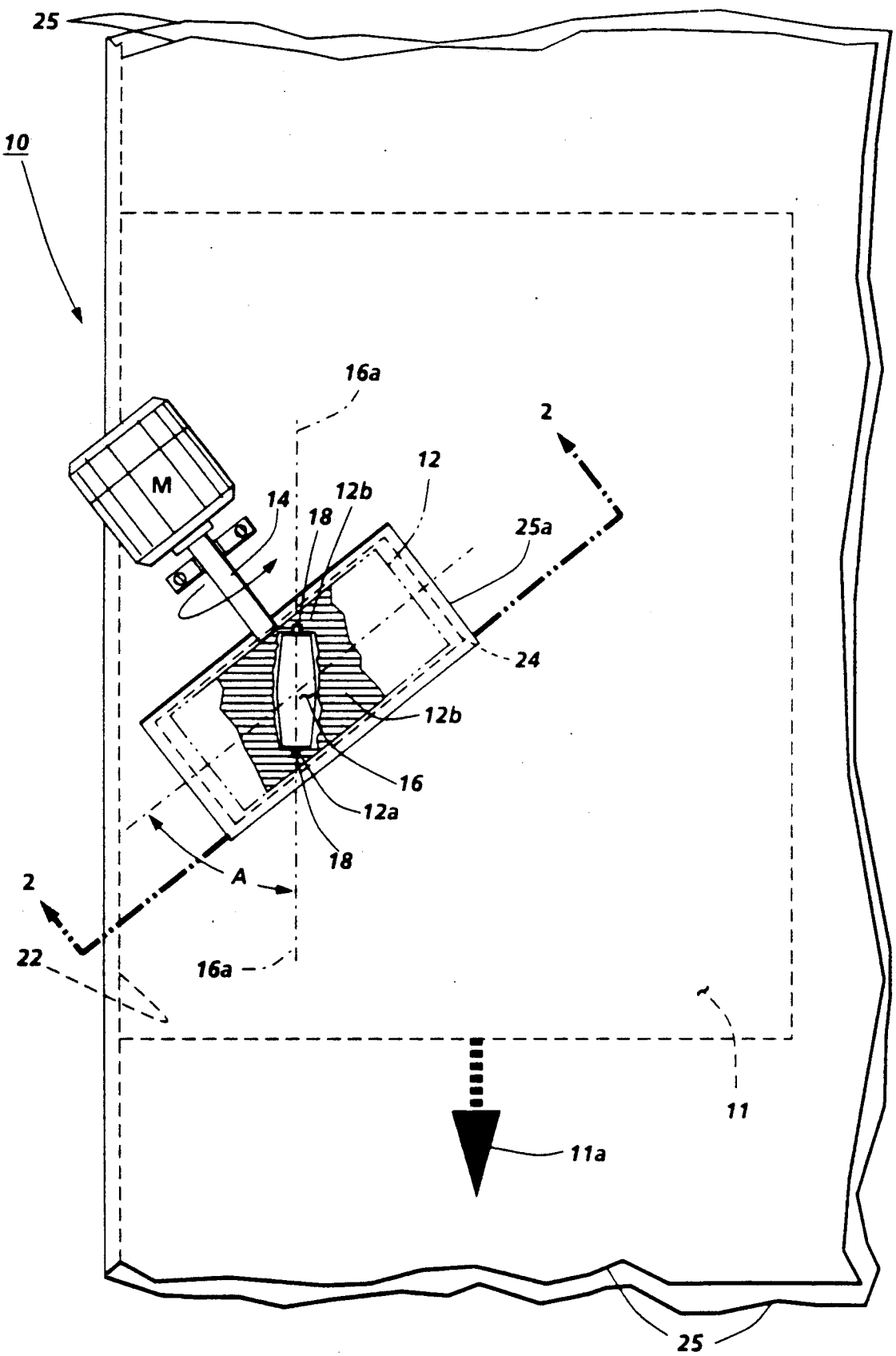

United States Patent [19]

Salomon

[11] Patent Number: 5,065,998

[45] Date of Patent: Nov. 19, 1991

[54] LATERAL SHEET REGISTRATION SYSTEM

[75] Inventor: James A. Salomon, Cheshire, Conn.

[73] Assignee: Xerox Corporation, Stamford, Conn.

[21] Appl. No.: 629,866

[22] Filed: Dec. 19, 1990

[51] Int. Cl.$^5$ .............................................. B65H 9/16
[52] U.S. Cl. .................................. 271/251; 271/252; 198/456; 198/722
[58] Field of Search .............. 271/225, 248, 250, 251, 271/252, 184, 185; 193/35 MD; 198/456, 457, 786, 722

[56] References Cited

U.S. PATENT DOCUMENTS

| | | | |
|---|---|---|---|
| 4,179,117 | 12/1979 | Rhodes, Jr. ........................ | 271/251 |
| 4,203,585 | 5/1980 | Kunz et al. ......................... | 271/4 |
| 4,223,884 | 9/1980 | Burnham et al. .................... | 271/21 |
| 4,306,713 | 12/1981 | Avritt et al. ........................ | 271/37 |
| 4,546,964 | 10/1985 | Linthout et al. .................... | 271/250 |
| 4,621,801 | 12/1986 | Sanchez .............................. | 271/251 |
| 4,744,554 | 5/1988 | Kulpa et al. ........................ | 271/251 |
| 4,775,142 | 10/1988 | Silverberg .......................... | 271/251 |
| 4,836,527 | 6/1989 | Wong ................................. | 271/251 |
| 4,981,209 | 1/1991 | Sogge ................................. | 193/35 MD |

FOREIGN PATENT DOCUMENTS 1552928  10/1967  France ...................... 193/35 MD

OTHER PUBLICATIONS

"Transwheel" ™ Kornylak Container Transporting System Two-Page sales brochure.

Primary Examiner—H. Grant Skaggs
Assistant Examiner—Carol Lynn Druzbick

[57] ABSTRACT

A simplified low cost, low wear, sheet registration and feeding system for laterally (side) registering a sheet without frictional drive slippage against the sheet and while maintaining feeding control in the primary forward feeding direction of the sheet. The sheet may be fed both forward and laterally (towards a side guide edge for side registration) utilizing only multiple sheet-engaging rotatable ellipsoidal rollers angularly mounted around the periphery of a fixed angle rotating hub member. The sheet-engaging rollers rotate with the hub member to so feed the sheet, but are also rotatable about their own, different, axes of rotation, which axes are parallel to the forward feeding direction of the sheet and the side guide to allow the sheet-engaging rollers to roll after side registration is achieved to prevent excessive lateral feeding force and undesirable slippage, smearing and/or wear.

10 Claims, 2 Drawing Sheets

LATERAL SHEET REGISTRATION SYSTEM

Disclosed herein is a sheet registration system which can laterally (side) register a moving sheet while maintaining controlled feeding in the primary feeding direction of the sheet. As disclosed, the present system can be very simple, preferably utilizing only multiple sheet-engaging rotatable rollers angularly mounted around the periphery of a rotating hub member so that the sheet-engaging rollers rotate with the rotating hub member but are also rotatable about their own, different, and differently angled, axes of rotation.

In the disclosed embodiment, the axes of rotation of the peripheral rollers are at a small angle relative to the axis of rotation of the rotating hub member. That latter axis is at a small angle to the primary feeding direction of the sheet, to impart a lateral movement force to the sheet, which can provide for positive side registration movement of the sheet. The axes of the illustrated peripheral rollers are approximately parallel to the primary sheet feeding direction to allow them to roll after side registration is achieved.

This disclosed system allows simple but controlled edge guide lateral sheet registration without excessive lateral force (overdriving) or undesirable slippage of the lateral registration sheet driving system on the sheet. By not requiring slippage for this registration, transport velocity in the primary direction of sheet movement may be maintained substantially constant. Thus, registration timing may be maintained constant, which is very valuable in overall sheet feeding systems controls.

The disclosed system may desirably be utilized in various paper or document paths of copiers, printers, electrostatographic or other reproducing machines, or the like, where it is desired to prevent or control lateral misregistration or skew of a sheet perpendicular to the primary feeding direction in which the sheet is being driven.

As shown by the disclosed embodiment, other desirable disclosed features, especially for low cost manufacture, include the facts that all the sheet-engaging rollers may be identical small diameter simple ellipsoidal or "barrel" shaped rollers, which may all be mounted in the same simple manner on a simple hub member, with simple central axis pin shafts or the like, in the same outer radius positions and distances. The invention is not limited to the disclosed embodiment, of course.

By way of background, as taught, for example, in Xerox Corporation U.S. Pat. No. 4,836,527 issued June 6, 1989 to Lam F. Wong, and other art cited therein, it is very desirable to provide a sheet edge registration system with positive, non-slip, non-wear, driving of a sheet forward in a primary feeding direction together with controlled side movement (transverse, perpendicular or lateral movement) of the same sheet against a side guide for side registration. As may be seen, the system disclosed in said U.S. Pat. No. 4,836,527, and others cited herein, is relatively complex. This and other U.S. patents on side registration systems further discuss desired features and difficulties for such systems, e.g., U.S. Pat. Nos. 4,546,964; 4,621,801; 4,775,142 and 4,744,554; 4,809,968; 4,919,318 and/or the curved (arcuate) sheet path slip-type cross-roller edge registration system of Sanchez U.S. Pat. No. 4,621,801. The present system may be used in various such sheet paths, and with more than one unit, if desired.

Slip-type systems can undesirably vary (increase) the transport time for high drag (e.g., heavy) sheets. The present system can avoid this. There is disclosed herein a low cost and simple system for achieving these and other desired features. The present system is also relatively uncritical as to specific hardware components and materials as compared to many other such apparatus or systems. The particular or specific angles and components may be selected, defined or refined by simple experimentation, and may vary depending on the type of sheets to be fed.

Other art of interest, re sheet feed roller drives with driven rotatable hubs and a multiplicity of small diameter rotatable rollers mounted around the periphery thereof, include the IBM "wave" document separator-feeder 25 in U.S. Pat. No. 4,306,713 (or 13 in U.S. Pat. No. 4,203,585); and the "Transwheel" TM Kornylak container transporting system, having peripheral roller axes in the primary direction of movement, which is also the hub rotation direction, to allow manual lateral movement of the containers. Neither of these systems provides an automatic side registration function or are angularly mounted to impart side movement to a sheet, as in the present system.

A specific feature of the specific embodiment(s) disclosed herein is to provide a positive lateral side edge registration and feeding system for feeding sheets in a primary sheet feeding direction and velocity yet also providing lateral repositioning of said sheets in a side registration direction, comprising a hub member rotatable about a central axis of rotation so as to rotate primarily in said primary sheet feeding direction but at an acute small lateral angle thereto, said hub member having rollers mounted to the periphery of said hub member for engaging said sheets, which rollers are rotatable with said hub member to impart sheet feeding forces to said sheets in both said primary sheet feeding direction and said lateral side registration direction as said hub member is rotated at said small lateral angle to said primary sheet feeding direction, and wherein said rollers are independently rotatable about their own axes, which roller axes are at approximately said same acute small angle to said hub member, so that said rollers may rotate approximately perpendicular to said primary sheet feeding direction to limit said sheet feeding forces in said lateral side registration direction.

Further specific features provided by the system disclosed herein, individually or in combination, include those wherein there is no significant slippage between said rollers and said sheets, and wherein there is no significant variation in said primary sheet feeding direction velocity; and/or wherein said hub member is rotatably driven on a fixed shaft providing a constant said angle of up to approximately 30 degrees; and/or wherein said lateral repositioning of said sheets is towards engagement with a fixed lateral side guide to provide said lateral side edge registration, and wherein said rollers rotate about their own axes approximately parallel to said lateral side guide to limit said sheet feeding forces in said lateral repositioning direction after said sheets engage said lateral side guide and to avoid slippage between said rollers and said sheets; and/or wherein said rollers do not rotate about their own axes before said sheets engage said lateral side guide and/or do not slip relative to said sheets; and/or wherein said rollers are barrel shaped and elastomeric. Further disclosed is a simplified sheet side registration and feeding system for laterally registering a sheet transversely to a primary sheet feeding direction without substantial frictional drive slippage, comprising a fixed side guide parallel to said primary sheet feeding direction and a fixed axis axially rotating hub member rotatable primarily in a primary feeding direction but also at a small fixed angle towards said side guide, and multiple sheet engaging rotatable crowned rollers angularly mounted around the periphery of said hub member, wherein said sheet-engaging rollers rotate with said hub member to feed the sheet both in said primary sheet feeding direction and also laterally towards said side guide for said side registration, but wherein said rollers are also rotatable about their own, different, axes of rotation, which roller axes of rotation are substantially parallel to said side guide to allow said sheet-engaging rollers to roll about their own axes after said side registration is achieved to prevent excessive lateral feeding force and undesirable slippage, while maintaining feeding control in said primary sheet feeding direction; and/or wherein said rollers are generally ellipsoidal shaped; and/or wherein said rollers are barrel shaped and elastomeric; and/or wherein said rollers do not normally rotate about their own axes before said sheets engage said side guide and do not normally slip relative to said sheets, and/or wherein there is no substantial variation in said primary sheet feed directions velocity.

As xerographic and other copiers or printers increase in speed, and become more automatic, it is increasingly important to provide higher speed, yet more reliable and more automatic handling of the sheets being handled. It is desirable to reliably feed and accurately register for copying sheets of a variety or mixture of sizes, types, weights, materials, conditions and susceptibility to damage. The images on sheets (and/or their fusing if they are themselves copies), can change the sheet feeding characteristics, and these images may be subject to damage in feeding if not properly handled, especially smearing of freshly typed typewriting ink, freshly printed ink jet printer output, etc.

Avoidance of sheet skewing during feeding, and maintaining proper registration and feed timing of documents and copy sheets, is also important. If the document or sheet is not properly fed and registered then undesirable dark borders and/or edge shadow images may appear on the ensuing copy sheet, or information near an edge of the document may be lost, i.e. not copied onto the copy sheet. Document misregistration, especially skewing, can also adversely affect further feeding, ejection, and/or restacking of the documents. Velocity variations can affect sheet jam detection systems or other time critical systems.

In the description herein, the term "document" or "sheet" refers to a usually flimsy sheet of paper, plastic, or other such conventional individual image substrate, and not to microfilm or electronic images which are generally much easier to manipulate.

All references cited in this specification, and their references, are incorporated by reference herein where appropriate for appropriate teachings of additional or alternative details, features, and/or technical background.

Figure 2:
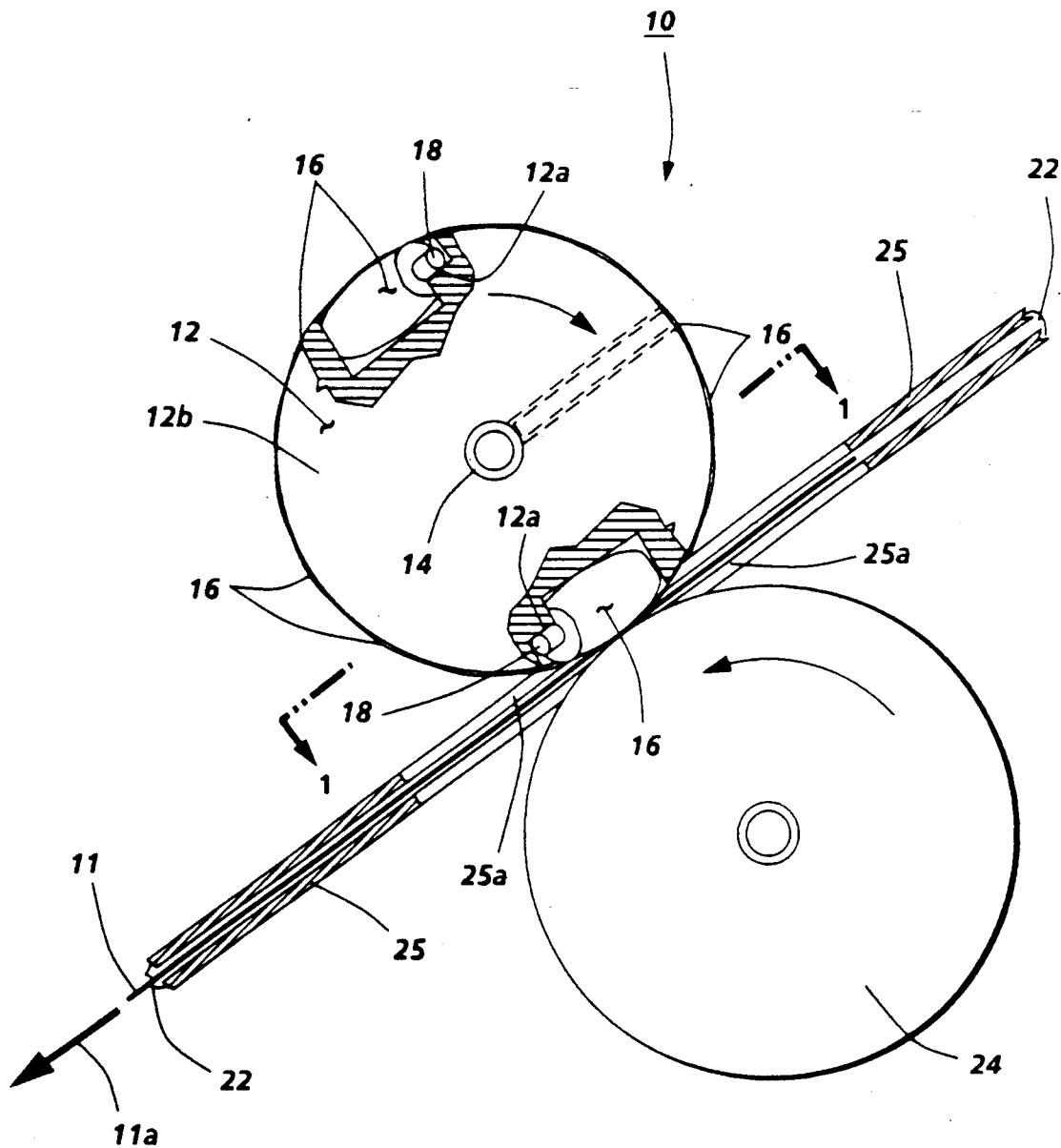

Various of the above-mentioned and further features and advantages will be apparent from the specific apparatus and its operation described in the example(s) below, as well as the claims. Thus, the present invention will be better understood from this description of an embodiment thereof, including the drawing figures (approximately to scale) wherein:

FIG. 1 is a partly broken-away top view of one embodiment of the disclosed system, partially cross-sectional along line 1—1 of FIG. 2; and FIG. 2 is an angular side view taken along the line 2—2 of FIG. 1, with a broken-away area to better show one sheet-engaging roller.

Describing now in further detail the exemplary embodiment with reference to the Figures, there is shown an exemplary system 10 for transporting and side edge registration of a stream of sheets such as 11, by way of one example or application of the subject system. The exemplary sheet 11 here is a typical relatively flimsy and delicate paper sheet such as in a printer or copier. The illustrated system 10 consists of a generally cylindrical disk hub 12 conventionally centrally axially mounted on and fixed to a rotatable shaft 14 driven by a motor M, and with much smaller rollers 16 mounted around the hub 12 circumference. The sheet 11 is driven, fed or assisted along a primary movement direction 11a by the system 10. This system 10 may be an integral part of an otherwise conventional copier or printer paper path, or the like, having such a primary direction of movement 11a. Also shown here is sheet side guide (sheet edge registration wall) 22 at least partially extending along one side or edge of this sheet path, as is conventional in side edge registration systems of the type discussed above.

Unlike many prior edge registration systems such as are cited above, this may be a non-slip, and relatively non-wearing, drive, yet not damage the sheet by overdriving it against a side guide such as 22 (for which reason slip is often provided in edge registration systems). Nor does the present system require any elaborate means for rotation of the feed roller axis to avoid damaging or buckling the sheet by overdriving it against a lateral edge or side guide member such as 22, as alternatively noted in the art above.

The rollers 16 are multiple (e.g., 12–14 or so) sheet-engaging rotatable rollers evenly spaced circumferentially around the radial periphery of the rotated hub member 12. Preferably all the rollers 16 are identical small diameter simple ellipsoidal or "barrel" shaped rollers. The rollers 16 may be elastomeric, or have a grit surface, for non-slip engagement with the paper sheet 11 surface.

Each roller 16 is rotatably mounted so as to be independently freely rotatable about its own central axis 16a, but not in the primary sheet feeding direction 11a, rather, perpendicular thereto, which is parallel to edge guide 22.

However, the rollers 16 may all be mounted in the same simple manner on the hub member 12, in the same outer radial positions and with relatively small distances between rollers 16, to form a uniform ring defining the outermost and sheet engaging periphery of the integral unit consisting of the hub 12 and its rollers 16.

Thus, as the hub 12 is rotatably driven about its shaft 14 axis, the rollers 16 are integrally rotated therewith around the same axis. That axis of rotation 14 is nearly perpendicular or transverse to the primary sheet direction 11a, but at a small angle A thereto. That is, that overall movement of the set of rollers 16 with their hub 12 rotation is at an acute angle A of up to approximately 30 degrees or so to the primary feeding direction 11a at the point of sheet 11 engagement, so that each successive roller 16 engagement with the sheet 11 as the hub 12 rotates drives the sheet 11 forward along its primary path 11a, but also drives the sheet laterally with a small vector force component thereof perpendicular the sheet side guide (edge registration wall) 22. The angle A may desirably remain fixed in operation. Thus, a simple fixed shaft 14 drive M may be used. The roller 16 axes 16a are mounted at this same angle A relative to the hub 12 so that the axes of the rollers 16 are not at an angle A to the sheet path 11a, they are parallel thereto.

The desirable present angle A is a function of the maximum amount of sheet side-shift which may be needed in the particular application and the forward movement distance available in which that side-shift may be done, i.e., the primary travel distance in which the sheet is released between upstream and downstream transports and is thus free to be side-shifted. The optimum angle A and the lateral registration force provided may also vary depending on the coefficient of friction of the particular rollers 16 and their bearings 16a relative to mounting hub 12, and the particular sheet handling environment, and will preferably be optimized by simple actual experimentation. That is, the geometry, materials and other design parameters of the rollers 16 determine whether the rollers 16 slip or not, and the right amount of frictional drag on the shafts of the rollers 16 will produce sufficient lateral (side registration) force, yet also permit rolling instead of slip when the lateral movement of the sheet 11 is stopped by the side registration edge 22. I.e., the lateral force is limited.

This angled roller 16 rotatable mounting may be provided by simple pin shaft bearings 18, or the like, on axis 16a. Here, the roller 16 mounting shafts or axles 18 are shown press-fitted and/or cemented into notches 12a in bearing support flanges 12b provided in the hub 12. The flanges 12b may also provide integral end stops or limits and end bearing surfaces for the rollers 16, as shown. Various roller 16 mounting arrangements may be envisioned. However, by using a molded plastic hub 12, the illustrated clearance recesses for the rollers 16, the notches 12a, and the flanges 12b, may all be simply integrally pre-molded into the periphery of the hub 12. If increased rolling resistance is desired for the rollers 16, then roughened surfaces or frictional material may be used in the bearing surfaces. Contrarily, Teflon washers or the like may be used to reduce roller 16 rolling resistance if desired. Alternatively, conical thrust faces or other bearing geometry changes may be made. Alternatively, some degree of flexibility could be provided in the bearing mountings. Thus, in this and others ways, the above-noted optimization of angle A and the desired lateral registration force level may be set and adjusted for the particular application by those skilled in the art with routine engineering.

Opposing and in nip with the integral hub 12 and rollers 16 unit here is an idler roller 24. This is merely one example. A corrugator, or even a ski surface, or other normal force or nip surface, might also be used. The idler 24 may be at the same angle as the hub 12, i.e., with an axis of rotation parallel to shaft 14, since this is desirably a non-slip system (although some limited slip versus the idler is permissable.) The sheet 11 is conventionally fed therebetween into this nip along a sheet transport support surface defined in this example by a pair of parallel baffles 25. The baffles 25 may be conventionally apertured 25a in the area of the integral hub 12 and rollers 16 unit and said mating idler 24, as shown. The material of this idler roller 24 is not critical. The normal force with which this idler roller 24 presses sheet 11 against the rollers 16 when the sheet 11 is in the nip therebetween may be spring loaded and/or adjustable, since that nip normal force also affects the drag or friction of the roller 16 bearings, and that in turn affects the rolling resistance and the lateral vector drive force of the system 10, as noted above.

The rollers axes 16a are in planes generally parallel the plane of the sheet 11 so as to allow the rollers 16 to generally centrally engage the sheet 11, but since the rollers are preferably crowned, provided by their preferable ellipsoidal shape, this is not critical, i.e., the rollers 16 do not have to roll flat against the sheet 11 or the idler 24. The elipsoid rollers shapes also desirably maintains a circular periphery of the overall unit for feeding uniformity.

As noted, each roller 16 axis 16a is at a small angle A relative to the axis of the shaft 14 so as to be perpendicular to the primary sheet path 11a. The ability of the rollers 16 to freely rotate at an angle relative to the rotation of the hub 12 provides for lateral vector force registration of each incoming sheet 11 up to the conventional side edge registration guide wall 22, but not overdriving the sheet laterally after the sheet has engaged (abutted) and is sliding along the wall 22 in its primary feeding direction 11a. Simultaneously, the system 10 provides a much larger vector force driving of the sheet 11 in its primary feeding direction 11a, both before and after this side registration. That is, the multiple sheet-engaging rotatable rollers 16 are appropriately angularly mounted around the periphery of the rotating hub member 12, and the hub driving angle is appropriately such, that as the rollers 16 rotate with the hub member 12 they are also rotatable about their own axes of rotation after the sheet 11 abuts the side guide 22, to impart a limited lateral movement force to the sheet which provides for positive but controlled side registration movement of the sheet 11 but then prevents undesired frictional slippage between the rollers 16 and the sheet 11 by allowing the rollers 16 to axially rotate once the resistance of the sheet to further lateral movement exceeds the resistance of the rollers 16 to axial rolling, as when a sheet is registered.

To further express the function and theory of operation, the system 10 provides for side-registering a paper sheet 11 against edge guide wall 22 without smear-inducing slip against the paper. This is provided with the ability of the small peripheral barrel rollers 16 to roll on axes generally parallel the side guide 22, which prevents sliding, and hence smear, after side registration has been accomplished. Yet the roller 16 axes 16a are only displaced slightly from the angled driving direction of the sheet driving roll (hub 12), a minor vector component of which is driving the sheet 11 towards the side wall 22 to generate side registration force for lateral sheet movement. Before the sheet reaches the side registration edge, there is no relative motion between the sheet and the rollers. The rollers 16 do not normally rotate before the sheet 11 reaches the side registration edge 22. However, once the sheet 11 does fully engage the registration edge 22, the rollers 16 now advance the sheet only in the forward or primary direction 11a. The rollers 16 now rotate about their own axes and thus do not need to slip relative to the sheet. As noted, the geometry and other design parameters of the rollers 16 affecting their rolling resistance determines whether the rollers 16 roll or slip, and with what force. The right amount of drag on the shafts and/or ends of the rollers will both produce sufficient side force on the sheet for lateral registration and yet also permit rolling about their axes 16a after registration. The rollers 16 stop their rotation about their own axes 16a by the friction of their bearings other than in this post side registration mode.

Thus, the system 10 generally functions somewhat like an above-cited U.S. Pat. No. 4,621,801 cross-roll type side registration system, (and a similar arcuate edge guide slot 74 may even be used with the system 10 for edge guide 22, if desired), but without the crossed-rollers systems undesired slip and wear and velocity loss. The rollers 16 roll instead, once the sheet hits the registration edge guide 22. Note that even if the roller axes 16a are not quite parallel the edge guide 22, the amount of slip would still be relatively insignificant in the system 10 as compared to the relatively much larger angles between the U.S. Pat. No. 4,621,801 crossed rolls and between those rolls and their edge guide slot.

While the embodiment disclosed herein is preferred, it will be appreciated from this teaching that various alternatives, modifications, variations or improvements therein may be made by those skilled in the art, which are intended to be encompassed by the following claims:

What is claimed is:

1. A positive lateral side edge registration and feeding system for feeding sheets in a primary sheet feeding direction and velocity yet also providing lateral repositioning of said sheets in a side registration direction, comprising a hub member rotatable about a central axis of rotation so as to rotate primarily in said primary sheet feeding direction but at an acute small lateral angle thereto, said hub member having rollers mounted to the periphery of said hub member for engaging said sheets, which rollers are rotatable with said hub member to impart sheet feeding forces to said sheets in both said primary sheet feeding direction and said lateral side registration direction as said hub member is rotated at said small lateral angle to said primary sheet feeding direction, and wherein said rollers are independently rotatable about their own axes, which roller axes are at approximately said same acute small angle to said hub member rotating direction so that said rollers may rotate approximately perpendicular to said primary sheet feeding direction to limit said sheet feeding forces in said lateral side registration direction.

2. The positive lateral side edge registration and feeding system of claim 1, wherein there is no significant slippage between said rollers and said sheets, and wherein there is no significant variation in said primary sheet feeding direction velocity.

3. The positive lateral side edge registration and feeding system of claim 1, wherein said lateral repositioning of said sheets is towards engagement with a fixed lateral side guide to provide said lateral side edge registration, and wherein said rollers rotate about their own axes approximately parallel to said lateral side guide to limit said sheet feeding forces in said lateral repositioning direction after said sheets engage said lateral side guide and to avoid slippage between said rollers and said sheets.

4. The positive lateral side edge registration and feeding system of claim 3, wherein said hub member is rotatably driven on a fixed shaft providing a constant said angle of up to approximately 30 degrees.

5. The positive lateral side edge registration and feeding system of claim 3, wherein said rollers do not rotate about their own axes before said sheets engage said lateral side guide and do not slip relative to said sheets.

6. The positive lateral side edge registration and feeding system of claim 1, wherein said rollers are barrel shaped and elastomeric.

7. A simplified sheet side registration and feeding system for laterally registering a sheet transversely to a primary sheet feeding direction without substantial frictional drive slippage, comprising a fixed side guide parallel to said primary sheet feeding direction and a fixed axis axially rotating hub member rotatable primarily in a primary feeding direction but also at a small fixed angle towards said side guide, and multiple sheet engaging rotatable crowned rollers angularly mounted around the periphery of said hub member, wherein said sheet-engaging rollers rotate with said hub member to feed the sheet both in said primary sheet feeding direction and also laterally towards said side guide for said side registration, but wherein said rollers are also rotatable about their own, different, axes of rotation, which roller axes of rotation are substantially parallel to said side guide to allow said sheet-engaging rollers to roll about their own axes after said side registration is achieved to prevent excessive lateral feeding force and undesirable slippage, while maintaining feeding control in said primary sheet feeding direction.

8. The sheet side edge registration and feeding system of claim 7 wherein said rollers are generally ellipsoidal shaped.

9. The sheet side edge registration and feeding system of claim 7 wherein said rollers are barrel shaped and elastomeric.

10. The sheet side edge registration and feeding system of claim 7 wherein said rollers do not normally rotate about their own axes before said sheets engage said side guide and do not normally slip relative to said sheets, and wherein there is no substantial variation in said primary sheet feed directions velocity.

* * * * *